United States Patent
Cho et al.

(10) Patent No.: US 8,837,352 B2
(45) Date of Patent: Sep. 16, 2014

(54) METHOD FOR ALLOCATING RESOURCES IN A BROADBAND WIRELESS ACCESS SYSTEM

(75) Inventors: Hee Jeong Cho, Anyang-si (KR); Young Soo Yuk, Anyang-si (KR); Su Nam Kim, Anyang-si (KR); Yong Ho Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 332 days.

(21) Appl. No.: 13/263,329

(22) PCT Filed: Apr. 7, 2010

(86) PCT No.: PCT/KR2010/002131
§ 371 (c)(1),
(2), (4) Date: Oct. 6, 2011

(87) PCT Pub. No.: WO2010/117206
PCT Pub. Date: Oct. 14, 2010

(65) Prior Publication Data
US 2012/0026965 A1 Feb. 2, 2012

Related U.S. Application Data

(60) Provisional application No. 61/168,620, filed on Apr. 13, 2009, provisional application No. 61/167,161, filed on Apr. 7, 2009.

(30) Foreign Application Priority Data

Apr. 7, 2010 (KR) ........................ 10-2010-0031774

(51) Int. Cl.
| H04B 7/212 | (2006.01) |
| H04W 74/00 | (2009.01) |
| H04L 1/16 | (2006.01) |
| H04W 28/04 | (2009.01) |
| H04W 72/04 | (2009.01) |
| H04W 74/08 | (2009.01) |

(52) U.S. Cl.
CPC ........... *H04W 74/006* (2013.01); *H04L 1/1607* (2013.01); *H04W 28/04* (2013.01); *H04W 72/04* (2013.01); *H04W 74/0833* (2013.01)

USPC ........... 370/322; 370/348; 370/437; 370/447; 370/461

(58) Field of Classification Search
USPC ................... 370/322, 348, 437, 443, 447, 461
See application file for complete search history.

(56) References Cited

U.S. PATENT DOCUMENTS

| 5,493,569 A | 2/1996 | Buchholz et al. |
| 7,548,534 B2 | 6/2009 | Zimmerman et al. |

(Continued)

FOREIGN PATENT DOCUMENTS

| CN | 1882159 | 12/2006 |
| CN | 101155395 | 4/2008 |

(Continued)

OTHER PUBLICATIONS

The State Intellectual Property Office of the People's Republic of China Application Serial No. 201080006570.1, Office Action dated Jul. 2, 2013, 8 pages.

(Continued)

*Primary Examiner* — Alvin Zhu
(74) *Attorney, Agent, or Firm* — Lee, Hong, Degerman, Kang & Waimey

(57) ABSTRACT

The present invention relates to a broadband wireless access system, and more specifically, to a method and apparatus for efficiently allocating resources to terminals in a random access system. The method for performing such a random access procedure of a terminal in a broadband wireless system according to one embodiment of the present invention comprises: transmitting a preamble sequence to a random access region in a base station; and receiving from the base station ACK information indicative of a received state of the preamble sequence. The ACK information receiving step is preferably a step of decoding a map information element that is masked as an identifier of the random access region.

15 Claims, 8 Drawing Sheets

(56) References Cited

U.S. PATENT DOCUMENTS

| | | | |
|---|---|---|---|
| 7,676,230 B2 | 3/2010 | Kang et al. | |
| 8,031,666 B2 | 10/2011 | Jeon et al. | |
| 8,310,921 B2 | 11/2012 | Cho et al. | |
| 8,503,404 B2 | 8/2013 | Kim et al. | |
| 2003/0124976 A1* | 7/2003 | Tamaki et al. | 455/15 |
| 2005/0054389 A1 | 3/2005 | Lee et al. | |
| 2006/0159015 A1 | 7/2006 | Seo et al. | |
| 2006/0239241 A1 | 10/2006 | Eom et al. | |
| 2007/0201399 A1 | 8/2007 | Lee et al. | |
| 2007/0206531 A1 | 9/2007 | Pajukoski et al. | |
| 2007/0206561 A1* | 9/2007 | Son et al. | 370/346 |
| 2009/0068944 A1 | 3/2009 | Kang et al. | |
| 2009/0109915 A1 | 4/2009 | Pasad et al. | |
| 2009/0137254 A1 | 5/2009 | Vukovic et al. | |
| 2010/0111029 A1 | 5/2010 | Chou et al. | |
| 2010/0220641 A1 | 9/2010 | Son et al. | |
| 2011/0176516 A1 | 7/2011 | Thakore et al. | |
| 2011/0286420 A1 | 11/2011 | Cho et al. | |
| 2012/0026873 A1 | 2/2012 | Spinar et al. | |
| 2012/0147840 A1 | 6/2012 | Chen | |
| 2012/0163321 A1 | 6/2012 | Lee et al. | |
| 2012/0307674 A1 | 12/2012 | Mogre et al. | |

FOREIGN PATENT DOCUMENTS

| | | |
|---|---|---|
| CN | 101207535 | 6/2008 |
| CN | 101400144 | 4/2009 |
| CN | 100546415 | 9/2009 |
| CN | 102144426 | 8/2011 |
| EP | 1940185 | 7/2008 |
| JP | 8-500227 | 1/1996 |
| JP | 9-083544 | 3/1997 |
| JP | 2002-527967 | 8/2002 |
| JP | 2006-135441 | 5/2006 |
| JP | 2008-510380 | 4/2008 |
| JP | 2008-295014 | 12/2008 |
| KR | 10-2005-0029112 | 3/2005 |
| KR | 10-2005-0052124 | 6/2005 |
| KR | 10-2006-0083935 | 7/2006 |
| KR | 10-0703303 | 4/2007 |
| KR | 10-2007-0065549 | 6/2007 |
| KR | 10-2008-0043471 | 5/2008 |
| KR | 1020080054987 | 6/2008 |
| KR | 1020080063594 | 7/2008 |
| KR | 10-0937432 | 1/2010 |
| KR | 10-0975699 | 8/2010 |
| TW | M354286 | 4/2009 |
| WO | 2008/082908 | 7/2008 |
| WO | 2008/096627 | 8/2008 |
| WO | 2008/115699 | 9/2008 |
| WO | 2008/155931 | 12/2008 |
| WO | 2009/035905 | 3/2009 |

OTHER PUBLICATIONS

H. Cho et al., "Differentiated Random Access Scheme for Bandwidth Request in IEEE 802.16m Systems," IEEE 802.16 Broadband Wireless Access Working Group, IEEE C802.16m-08/970r1, Sep. 2008.

Y. Zhu et al., "Proposed Text Changes to the IEEE 802.16m SDD (802.16m-08/003r6), Section 11.9.2.5 on the Bandwidth Request Channel," IEEE 802.16 Broadband Wireless Access Working Group, IEEE C802.16m-09/0151, Jan. 2009.

M. Okuda et al., "Consecutive Transmission of Bandwidth Request Indicators," IEEE 802.16 Broadband Wireless Access Working Group, IEEE C802.16m-08/963, Sep. 2008.

State Intellectual Property Office of the People's Republic of China Application Serial No. 201080006548.7, Office Action dated Aug. 28, 2013, 6 pages.

The State Intellectual Property Office of the People's Republic of China Application Serial No. 201080006548.7, Office Action dated Mar. 18, 2014, 6 pages.

The State Intellectual Property Office of the People's Republic of China Application Serial No. 200980134690.7, Office Action dated Dec. 23, 2013, 5 pages.

United States Patent and Trademark Office U.S. Appl. No. 13/147,566, Office Action dated Dec. 20, 2013, 6 pages.

U.S. Appl. No. 13/620,713, Office Action dated May 12, 2014, 8 pages.

* cited by examiner

METHOD FOR ALLOCATING RESOURCES IN A BROADBAND WIRELESS ACCESS SYSTEM

This application is the National Stage Filing under U.S.C. 371 of International Application No. PCT/KR2010/002131, filed on Apr. 7, 2010, which claims the benefit of earlier filing date and right of priority to Korean Application No. 10-2010-0031774, filed on Apr. 7, 2010, and also claims the benefit of U.S. Provisional Application Ser. Nos. 61/168,620, filed on Apr. 13, 2009, and 61/167,161, filed on Apr. 7, 2009, the contents of which are all incorporated by reference herein in their entirety.

TECHNICAL FIELD

The present invention relates to a broadband wireless access system, and more specifically, to a method and apparatus for efficiently allocating resources to a terminal in a random access system.

BACKGROUND ART

In the following description, a procedure for requesting a random access uplink resource in a broadband wireless access system is explained.

FIG. 1 shows a 3-step uplink resource request procedure executable in a general IEEE 802.16 system.

Referring to FIG. 1, a mobile station (AMS) sends a quick access message including a bandwidth request (BR) preamble sequence (i.e., BR code), an uplink bandwidth request information (e.g., station ID, BR index indicating a size of a requested resource, etc.) and the like to a base station (S101).

The base station may transmit a reception state of the BR preamble sequence and the quick access message, which were sent by each mobile station, to the corresponding mobile station via a bandwidth request acknowledgement A-MAP information element (BR ACK A-MAP IE) [S102].

If the base station normally receives the BR preamble sequence and the quick access message sent by the mobile station, it may allocate an uplink (UL) resource to the corresponding mobile station via an uplink basic assignment A-MAP information element (UL basic assignment A-MAP IE) [S103].

The mobile station may be able to transmit data to the base station via the allocated UL resource [S104].

FIG. 2 shows a 5-step uplink resource request procedure executable in a general IEEE 802.16 system.

FIG. 2 assumes a fall-back mode corresponding to a case that a quick access message is lost. Referring to FIG. 2, a mobile station (AMS) sends a quick access message including a bandwidth request (BR) preamble sequence (i.e., BR code), an uplink bandwidth request information (e.g., station ID, BR index indicating a size of a requested resource, etc.) and the like to a base station (S201).

In this case, the base station is not able to normally decode the quick access message due to transmission error [S202].

The base station may transmit a reception state of the BR preamble sequence and the quick access message, which were sent by each mobile station, to the corresponding mobile station via a bandwidth request acknowledgement A-MAP information element (BR ACK A-MAP IE) [S203].

If the base station normally receives the BR preamble sequence transmitted by the mobile station only, since the base station may be unable to know a size of a resource requested by the mobile station, the mobile station allocates a UL resource for transmitting a bandwidth to the mobile station via CDMA allocation A-MAP IE [S204].

The mobile station sends a BW-REQ message (e.g., a header type) including information of the resource requested by the mobile station to the base station via the allocated resource [S205].

If the base station receives the BE-REQ message sent by the mobile station, it may allocate an uplink (UL) resource to the corresponding mobile station via an uplink basic assignment A-MAP information element (UL basic assignment A-MAP IE) [S206].

The mobile station may be able to transmit data to the base station via the allocated UL resource [S207].

In case that the mobile station does not send the quick access message to the base station, it may become a general 5-step bandwidth request procedure.

FIG. 3 shows one example of an initial/handover ranging procedure executable in a general IEEE 802.16 system.

Referring to FIG. 3, first of all, a mobile station transmits a ranging preamble code for the usage of initial/handover ranging to a base station [S301].

The base station may send a ranging acknowledgement (AAI_RNG-ACK) message including a received state and a physical (PHY) adjustment value (e.g., timing, power, frequency, etc.) for a ranging preamble code transmitted by each mobile station to the corresponding mobile station [S302].

Having normally received the ranging preamble code, the base station allocates a UL resource required for the mobile station to send a ranging request (AAI_RNG-REQ) message to the mobile station via CDMA allocation A-MAP IE [S303].

The mobile station sends AAI_RNG-REQ message to the base station via the allocated UL resource [S304].

In response to the AAI_RNG-REQ message sent by the mobile station, the base station sends a ranging response (AAI_RNG-RSP) to the mobile station [S305].

FIG. 4 shows one example of a periodic ranging procedure executable in a general IEEE 802.16 system.

Referring to FIG. 4, a mobile station transmits a ranging preamble code for the usage of periodic ranging to a base station [S401].

The base station may send a ranging acknowledgement (AAI_RNG-ACK) message including a received state and a physical (PHY) adjustment value (e.g., timing, power, frequency, etc.) for a ranging preamble code transmitted by each mobile station to the corresponding mobile station [S402].

In order for a mobile station to transmit a preamble code to a base station in the random access procedures described with reference to FIGS. 1 to 4, a region (i.e., RA region) for the mobile station to perform a random access should exist in a frame or a subframe corresponding to a unit smaller than that of the frame. This random access region (RA region) may be divided into a bandwidth request region (BR region) for the mobile station to request a UL resource allocation and a ranging region for the mobile station to attempt a ranging. One example of arranging this random access region is described with reference to FIG. 5 as follows.

FIG. 5 shows one example of an arrangement type of a random access region if a downlink-to-uplink ratio is 5:3 in a general IEEE 802.16 system.

Referring to FIG. 5, there is a random access region arranged in a $3^{rd}$ frame of a $1^{st}$ superframe. In particular, as mentioned in the foregoing description, the random access region may include bandwidth request regions 510 and 530 and a ranging region 520.

A base station may transmit a BR preamble sequence list and the like successfully received via the bandwidth request (BR) region to a mobile station via BR ACK A-MAP and may transmit a ranging preamble code list and the like successfully received via the ranging region to the mobile station via AAI_RNG-ACK message.

Based on the ACK information, the mobile terminal may be able to recognize whether its random access attempt has been successful. Therefore, the mobile station should check whether the above-mentioned ACK information is transmitted each subframe. If the ACK information is transmitted as a broadcast, the mobile station should decode the corresponding message or A-MAP to check a message of a different type or a type of A-MAP.

Therefore, in order for the mobile station not to perform unnecessary decoding, the mobile station should be aware in advance whether the corresponding data contains the ACK information (i.e., BR ACK A-MAP or AAI_RNG-ACK) until decoding the contents of the corresponding data.

DISCLOSURE OF THE INVENTION

Technical Problem

Accordingly, the present invention is directed to substantially obviate one or more problems due to limitations and disadvantages of the related art. First of all, an object of the present invention is to provide a method and apparatus for efficient random access.

Another object of the present invention is to provide a method and apparatus for efficiently determining a result from a random access attempt of a mobile station.

Technical tasks obtainable from the present invention are non-limited the above mentioned effect. And, other unmentioned technical tasks s can be clearly understood from the following description by those having ordinary skill in the technical field to which the present invention pertains.

Technical Solution

To achieve these and other advantages and in accordance with the purpose of the present invention, as embodied and broadly described, in a broadband wireless access system, a method of performing a random access procedure of a mobile station according to one embodiment of the present invention may include the steps of transmitting a preamble sequence to a random access region in a base station and receiving from the base station ACK information indicative of a received state of the preamble sequence. In this case, the ACK information receiving step may include the step of decoding a map information element masked with an identifier of the random access region.

To further achieve these and other advantages and in accordance with the purpose of the present invention, in a broadband wireless access system, a method of performing a random access procedure of a base station according to one embodiment of the present invention may include the steps of receiving a preamble sequence via a random access region from a mobile station, determining a received state of the preamble sequence, and broadcasting ACK information indicative of the received state of the preamble sequence in accordance with a result of the determining step. In this case, the ACK information is masked with an identifier of the random access region.

To further achieve these and other advantages and in accordance with the purpose of the present invention, a mobile station according to another embodiment of the present invention may include a processor and a radio communication (RF) module having a plurality of antennas, the radio communication module configured to transmit/receive a radio signal externally under the control of the controller. The processor may control the radio communication module to transmit a preamble sequence to a random access region in a base station and to obtain ACK information indicative of a received state of the preamble sequence by decoding a map information element received from the base station by being masked with an identifier of the random access region.

According to the above-mentioned embodiments, the random access region may include a bandwidth request (BR) region and a ranging region and the identifier of the random access region may be differently assigned in accordance with the bandwidth request region or the ranging region.

In this case, the identifier of the random access region may be assigned per frame or uplink subframe.

Moreover, if the preamble sequence is a bandwidth request preamble sequence, the random access region may preferably include the bandwidth request region and the ACK information may include a bandwidth request acknowledgement A-MP information element (BR ACK A-MAP IE).

Besides, if the preamble sequence is an initial or handover ranging preamble sequence, the random access region may preferably include the ranging region and the ACK information may preferably include a ranging acknowledgement (AAI_RNG-ACK) message.

Advantageous Effects

Accordingly, the present invention may provide the following effects and/or advantages.

First of all, according to embodiments of the present invention, a mobile station may be able to efficiently receive ACK information corresponding to the mobile station via an identifier assigned by a unit of subframe or frame without unnecessary decoding.

Secondly, according to embodiments of the present invention, a mobile station may be able to efficiently receive ACK information corresponding to a random access performed by the mobile station via an identifier assigned per usage without unnecessary decoding.

Effects obtainable from the present invention are non-limited the above mentioned effect. And, other unmentioned effects can be clearly understood from the following description by those having ordinary skill in the technical field to which the present invention pertains.

MODE FOR INVENTION

Figure 1:
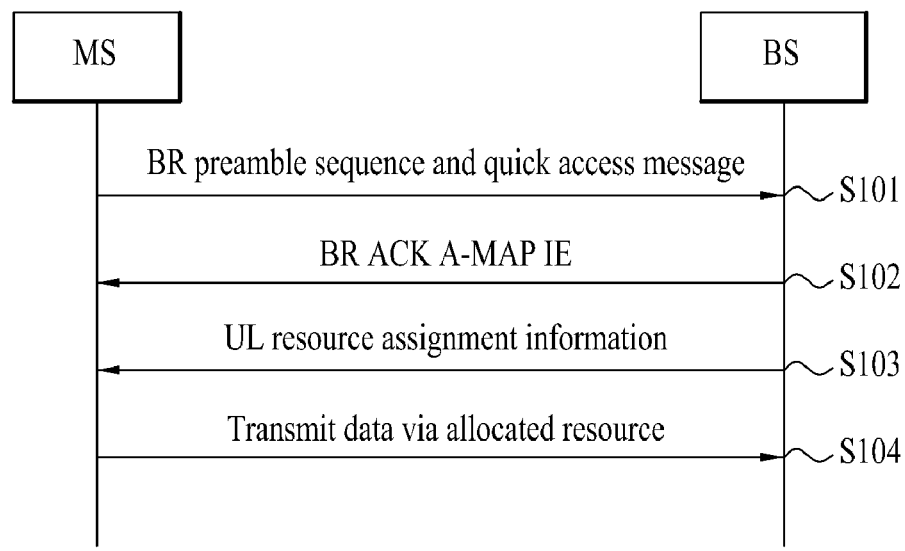
FIG. 1 shows a 3-step uplink resource request procedure executable in a general IEEE 802.16 system.
Figure 2:
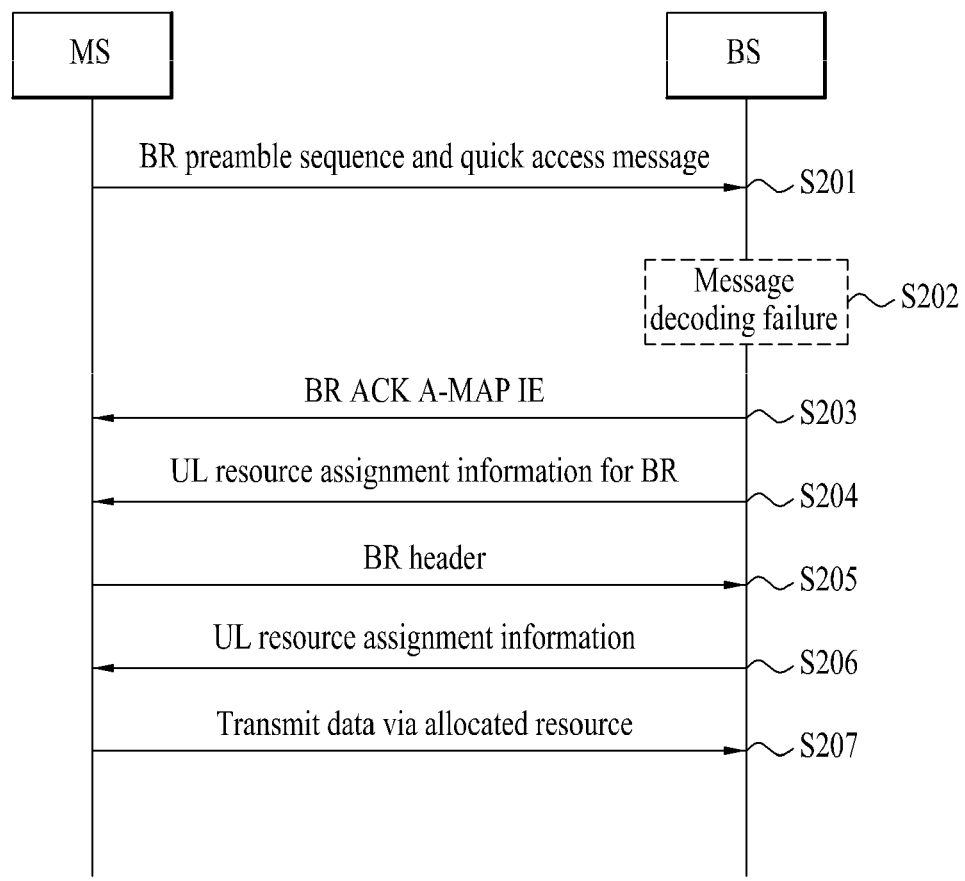
FIG. 2 shows a 5-step uplink resource request procedure executable in a general IEEE 802.16 system.
Figure 3:
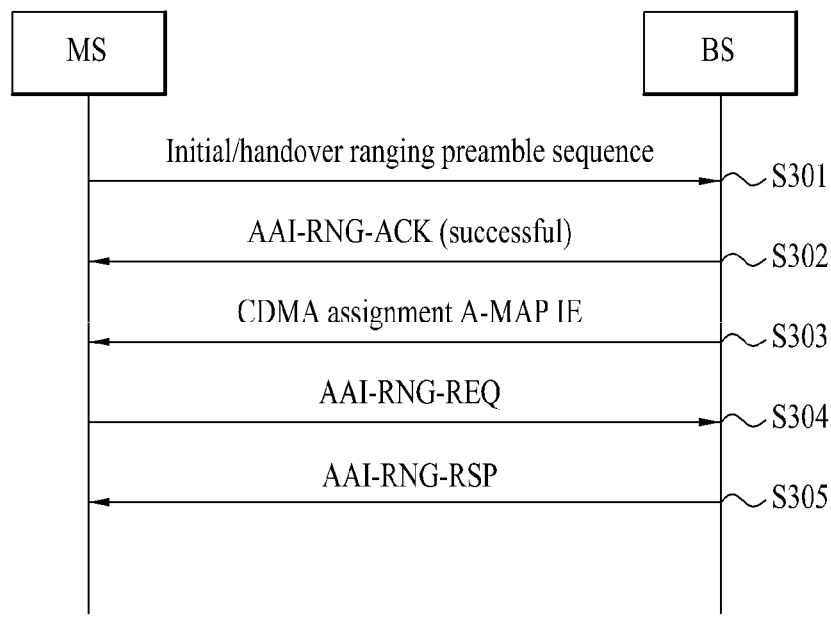
FIG. 3 shows one example of an initial/handover ranging procedure executable in a general IEEE 802.16 system.
Figure 4:
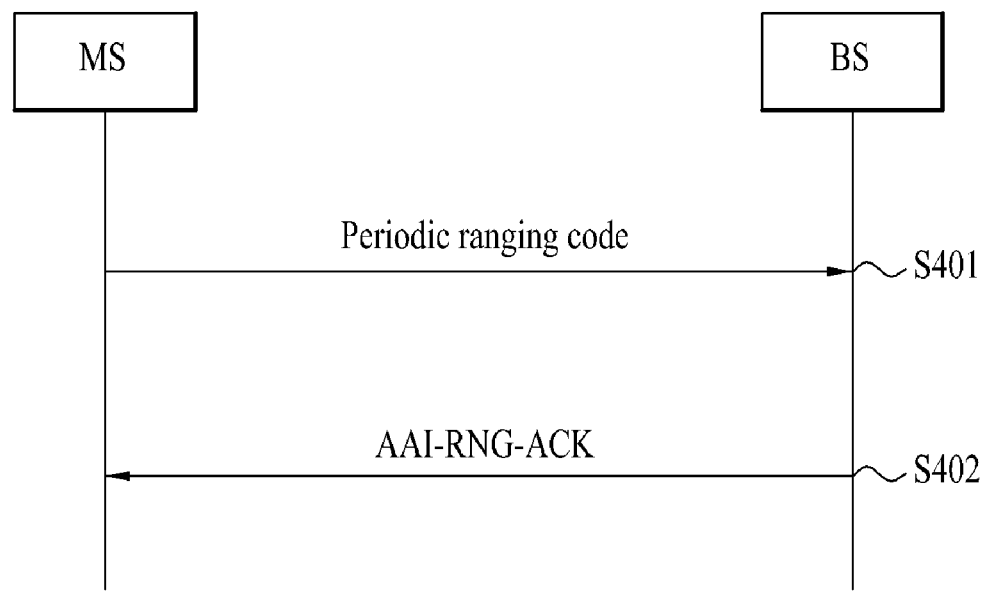
FIG. 4 shows one example of a periodic ranging procedure executable in a general IEEE 802.16 system.
Figure 5:
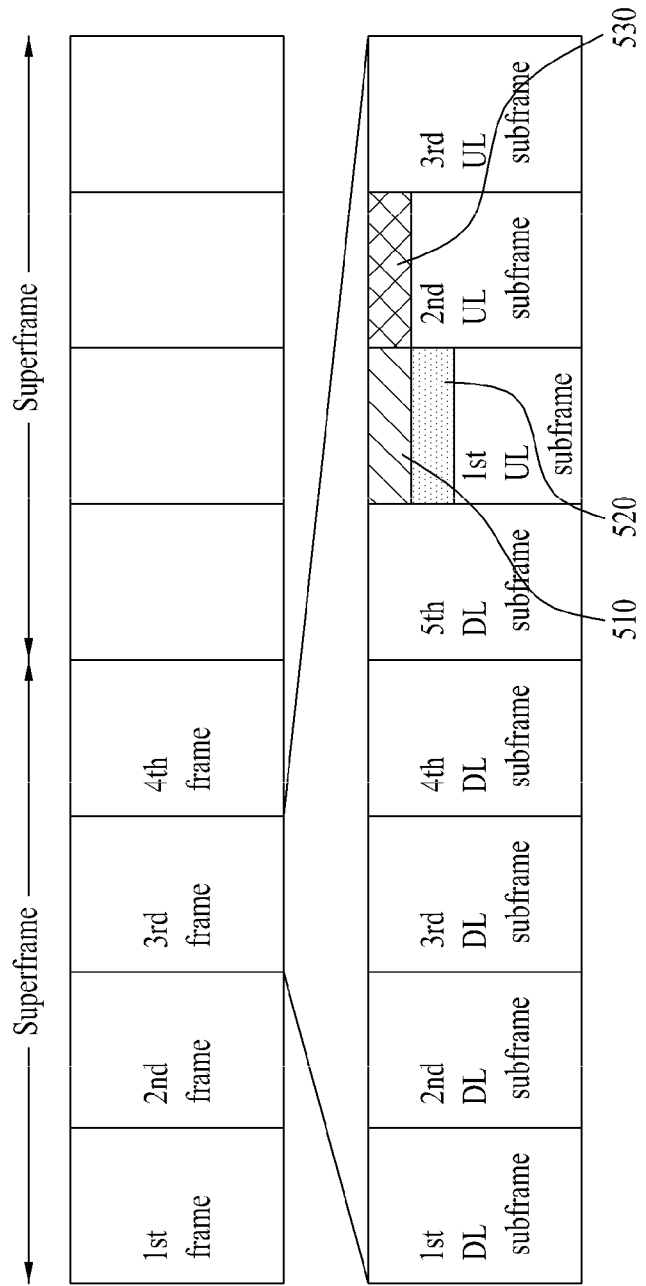
FIG. 5 shows one example of an arrangement type of a random access region if a downlink-to-uplink ratio is 5:3 in a general IEEE 802.16 system.

First of all, the following embodiments may correspond to combinations of elements and features of the present invention in prescribed forms. And, it may be able to consider that the respective elements or features are selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modifiable. Some configurations or features of one embodiment may be included in another embodiment or may be substituted for corresponding configurations or features of another embodiment.

In this disclosure, embodiments of the present invention may be described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks except the base station. In this case, 'base station (BS)' may be replaced by such a terminology as a fixed station, a Node B, an eNode B (eNB), an access point (AP), an advanced BS (ABS) and the like. And, 'terminal' may be replaced by such a terminology as a user equipment (UE), a mobile station (MS), a mobile subscriber station (MSS), an advanced mobile station (AMS), a subscriber station (SS) and the like.

Embodiments of the present invention may be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be saved in a memory unit and may be then drivable by a processor. The memory unit may be provided within or outside the processor to exchange data with the processor through the various means known to the public.

Embodiments of the present invention may be supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention may be supportable by the above documents. Moreover, all terminologies disclosed in this document may be supportable by at least one of P802.16-2004, P802.16e-2005, P802.16Rev2 and IEEE P802.16m documents which are the standards of IEEE 802.16 system.

In the following description, specific terminologies may be provided to help the understanding of the present invention. And, the use of the specific terminology can be modified into another form within the scope of the technical idea of the present invention.

Generally, cyclic redundancy check (CRC) bit(s) in A-MAP IE may be provided for the purpose of informing mobile stations that information contained in a corresponding A-MP is provided for which mobile station(s). And, the corresponding CRC bit(s) may be masked by an identifier (e.g., station ID (STID) using a bitwise XOR operation.

In case of a bandwidth request, 16-bit CRC transmitted together with BR ACK A-MAP IE may be generated based on the contents contained in the BR ACK A-MAP IE. Moreover, in case of a ranging request, 16-bit CRC transmitted together with A-MAP IE containing assignment information on AAI_RNG-ACK message may be generated based on the contents in assignment A-MAP IE.

Therefore, the present invention proposes that masking may be performed using an identifier (ID) or code indicating ACK information on each of a bandwidth request and a ranging request.

$1^{st}$ Embodiment

According to one embodiment of the present invention, proposed is to use a separate identifier for a random access (RA) region in each subframe or frame.

First of all, an assignment method per subframe may be described with reference to FIG. 6 as follows.

Figure 6:
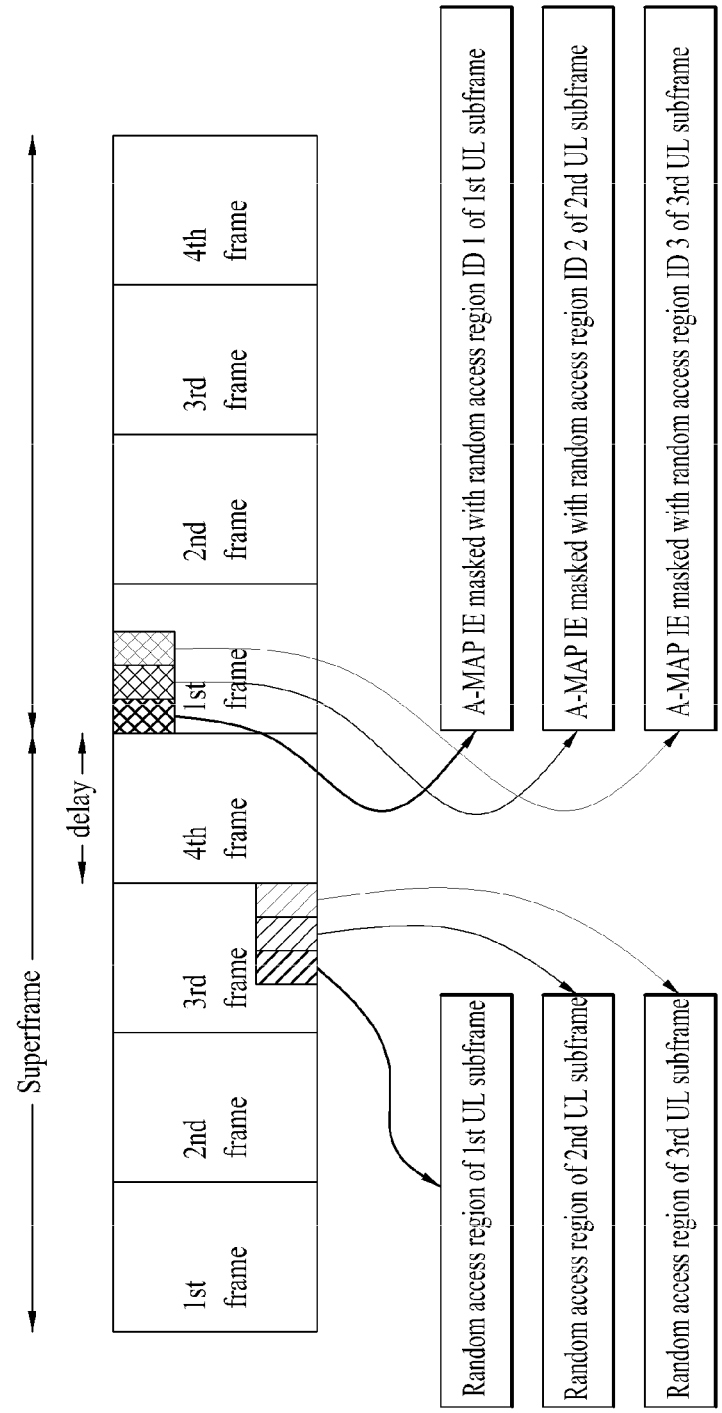
FIG. 6 shows one example of a method of assigning a separate identifier for a random access region each subframe according to one embodiment of the present invention.

FIG. 6 shows one example of a method of assigning a separate identifier for a random access region each subframe according to one embodiment of the present invention.

In FIG. 6, assume that a DL-to-UL ratio is set to 5:3 and that ACK information on a preamble sequence transmitted by a base station is transmitted after a delay of one frame.

In this case, it may be able to assign (hereinafter abbreviated ID) may be assigned to a random access (RA) region of each frame by a unit of one frame. In particular, ID 1 may be assigned to a $1^{st}$ UL subframe in a $3^{rd}$ frame of a $1^{st}$ superframe, ID2 may be assigned to a $2^{nd}$ UL subframe therein, and ID3 may be assigned to a $3^{rd}$ UL subframe therein.

When a mobile station transmits a preamble sequence carried on the RA region ID1 of the $1^{st}$ UL subframe, ACK information on the transmitted preamble sequence may be transmitted after one frame. In order for the mobile station to check the ACK information on the preamble sequence transmitted by the mobile station, it may be just able to perform decoding on A-MAP IE masked with the ID 1 without decoding all A-MAPs (or broadcast messages).

In this method, the number of necessary IDs may vary in accordance with the number of frames configuring a unit for ID assignment to a subframe. For instance, in case that ID is assigned by 5-frame unit, the number of total UL subframes per frame becomes '(# of UL subframes in a frame)*(frame unit)=3*5=15'. Hence, 15 IDs are required for one unit and the ID may be repetitively usable by 5-frame unit. Yet, a subframe failing to have a random access (RA) region may be excluded from the ID assignment.

According to another embodiment of the present invention, different IDs may be assigned in a manner of discriminating a bandwidth request (BR) region and a ranging region from each other. This may be described with reference to FIG. 7 as follows.

Figure 7:
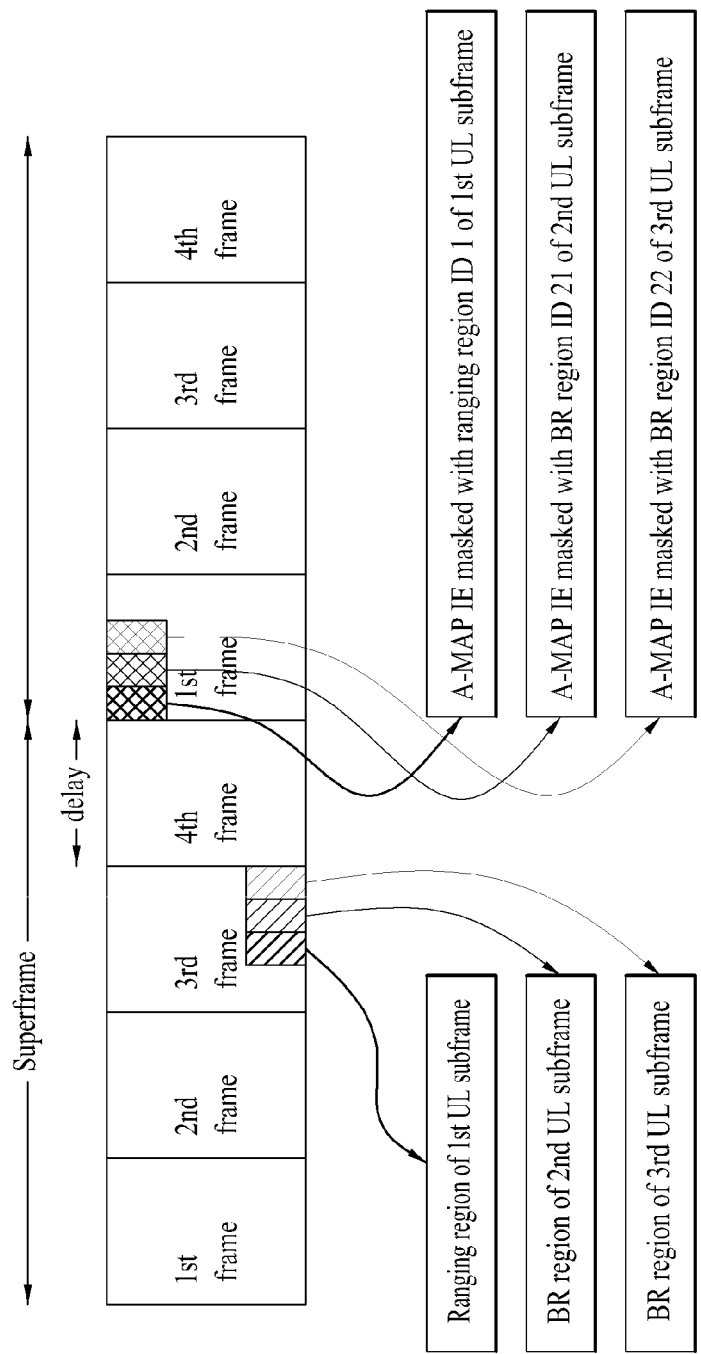
FIG. 7 shows one example of a method of assigning a separate identifier by discriminating a bandwidth request region and a ranging region from each other in each subframe according to one embodiment of the present invention.

FIG. 7 shows one example of a method of assigning a separate identifier by discriminating a bandwidth request region and a ranging region from each other in each subframe according to one embodiment of the present invention.

In FIG. 7, assume that a DL-to-UL ratio is set to 5:3 and that ACK information on a preamble sequence transmitted by a base station is transmitted after a delay of one frame. Assume that one of 1 to 20 is assigned as an identifier of a ranging region, that 1-digit identifier is assigned, and that one of the numbers starting with 21 is assigned as an identifier of a bandwidth request region.

In this case, different IDs may be assigned to a random access (RA) region of each subframe by one frame unit in a manner that a bandwidth request (BR) region and a ranging region are discriminated from each other. In particular, ID 1 may be assigned to a ranging region of a $1^{st}$ UL subframe in a $3^{rd}$ frame of a $1^{st}$ superframe, ID 21 may be assigned to a bandwidth request region of a $2^{nd}$ UL subframe therein, and ID 22 may be assigned to a bandwidth request region of a $3^{rd}$ UL subframe therein. If so, a mobile station may be aware of a usage (e.g., a type) of the corresponding region by recognizing the ID assigned to the corresponding random access region.

According to this embodiment, ID may be delivered to a mobile station in a manner of being contained in a broadcasted information or message. Alternatively, after assignment unit and sequence (or rule) of ID has been determined between a mobile station and a base station, the mobile station may be able to implicitly make a determined.

Meanwhile, after a delay of a previously defined subframe or frame unit, a base station may transmit a grant A-MAP IE (e.g., CDMA allocation A-MAP IE, basic assignment A-MAP IE) containing resource allocation information by each ID unit.

In this case, the grant A-MAP IE may directly indicate a region for carrying a bandwidth request (BW-REQ) message (i.e., a BR header) or a ranging message (AAI_RNG-REQ/RSP). Moreover, it may be also able to indicate a transmission region of a specific message indicating a region for carrying the BW-REQ or ranging message. Since CRC in the grant A-MAP IE is masked with a corresponding ID, a mobile station may just need to check A-MAP IE masked with an ID corresponding to a position (i.e., subframe) at which BR code (BR preamble sequence) or ranging code (ranging preamble sequence) has been transmitted by the mobile station. Therefore, it may be efficient since the mobile station does not need to check all A-MAP IE to obtain a resource allocation information.

As mentioned in the foregoing description, ID of a random access region may be assigned per frame. For instance, in case that ID is assigned by one superframe unit (e.g., frame # modulo 4), ID1, ID2, ID3 and ID4 may be assigned to $1^{st}$, $2^{nd}$, $3^{rd}$ and $4^{th}$ frames, respectively. In doing so, ID for discriminating a random access region may be assigned by frame unit. Alternatively, ID for a bandwidth request (BR) region and ID for a ranging region may be assigned in a manner of discriminating the BR region and the ranging region from each other.

$2^{nd}$ Embodiment

According to another embodiment of the present invention, proposed is to use a separate identifier in accordance with a usage of a random access (RA) region. In particular, irrespective of a position of a random access region, a different identifier may be usable in accordance with a corresponding usage.

For instance, ID '0' may be assigned to a ranging region and ID '1' may be assigned to a bandwidth request region. An assignment A-MAP IE may be CRC-masked with ID '0' and a bandwidth request A-MAP information element BR A-MAP IE) may be masked with ID '1'.

Therefore, in case that a mobile station transmits a bandwidth request preamble sequence to a base station, the mobile station may be able to obtain ACK information on the bandwidth request preamble sequence transmitted by the mobile station or information on an allocated resource by decoding A-MAP IE masked with ID 1 only without decoding all A-MAP IEs.

In the following description, types of A-MAP (grant A-MAP) containing resource allocation information applicable to the above-mentioned embodiments of the present invention are described with reference to Table 1 and Table 2.

Table 1 shows one example of a grant A-MAP type in case that ID is granted by discriminating a usage of a random access region. Table 2 shows one example of a grant A-MAP type in case that ID is granted without discriminating a usage of a random access region.

TABLE 1

| Type | Type of Grant A-MAP IE |
|---|---|
| Resource assignment information | Assigned region |
| MCS | Modulation and coding scheme used for message to be transmitted |
| Subframe index | Identifies the subframe in which the code was transmitted |
| Opportunity index | Identifies the opportunity in which the code was transmitted |
| Code index | Identifies the code transmitted by AMS |
| CRC | |

TABLE 2

| Type | Type of Grant A-MAP IE |
|---|---|
| Extended type (1 bit) | 0: BR grant, 1: Ranging grant |
| Resource assignment information | Assigned region |
| MCS | Modulation and coding scheme used for message to be transmitted |
| Subframe index | Identifies the subframe in which the code was transmitted |
| Opportunity index | Identifies the opportunity in which the code was transmitted |
| Code index | Identifies the code transmitted by AMS |
| CRC | |

Referring to Table 1 and Table 2, included in common are a type field indicating a type of Grant AMP IE, an MCS field indicating a modulation and coding scheme, a subframe index indicating a code transmitted position, an opportunity field, a code index field for identifying a code transmitted by a mobile station and the like.

Yet, since Table 2 shows a case that ID is granted irrespective of a usage of a random access region, a 1-bit extended type field for identifying a usage of a random access region, i.e., a resource assignment purpose may be further included.

Moreover, referring to Table 2, although the extended type field is represented for the usage in determining a BR grant or a ranging grant in the same field configuration, it may be able to indicate the configurations of the next-accompanied fields in accordance with a type field value and an extended type value. For instance, in case that an extended type filed includes a plurality of bits, if an extended type is set to 4 with the same type filed value, it may indicate that fields A, C and D are included. If an extended type is set to 5, it may indicate that fields A, B and F are included.

Configurations of Mobile and Base Stations

In the following description, a mobile station and a base station (FBS, MBS) are explained to implement the above-mentioned embodiments of the present invention.

First of all, a mobile station may work as a transmitter in uplink and may work as a receiver in downlink. A base station may work as a receiver in uplink and may work as a transmitter in downlink. In particular, each of the mobile station and the base station includes a transmitter and a receiver for transmission of information or data.

Each of the transmitter and the receiver can include a processor, a module, a part and/or a means for implementing embodiments of the present invention. In particular, each of the transmitter and the receiver can include a module (means) for encrypting a message, a module for interpreting the encrypted message, an antenna for transceiving the message and the like. One example of these transmitters and the receivers are described with reference to FIG. 8 as follows.

Figure 8:
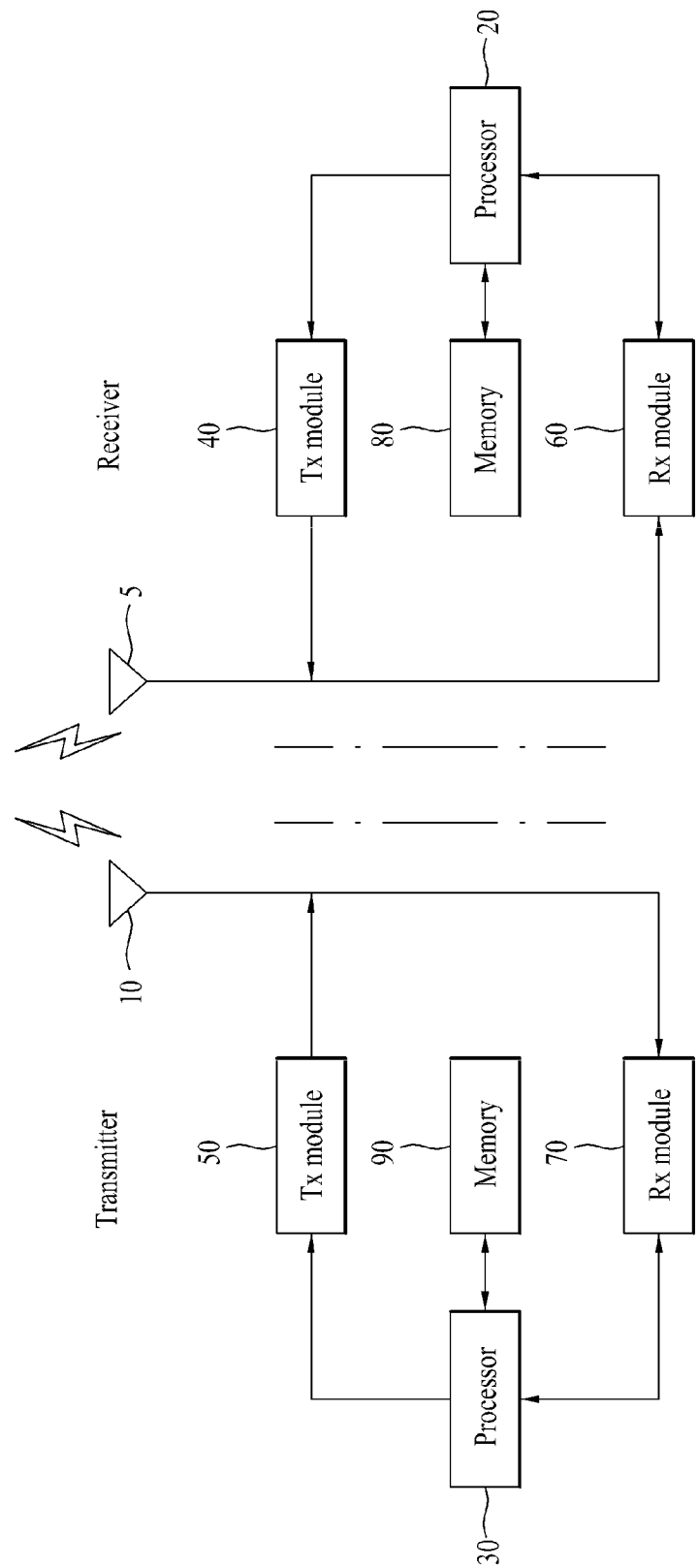
FIG. 8 is a block diagram for one example of configurations for a transmitter and a receiver according to another embodiment of the present invention.

FIG. 8 is a block diagram for one example of configurations for a transmitter and a receiver according to another embodiment of the present invention.

Referring to FIG. 8, a left part shows a configuration of a transmitter, while a right part shows a configuration of a receiver. Each of the transmitter and the receiver may include an antenna 5/10, a processor 20/30, a transmitting module (Tx module) 40/50, a receiving module (Rx module) 60/70 and a memory 80/90. In particular, the components may perform corresponding functions, respectively. And, the components may be described in detail as follows.

The antenna 5/10 may externally transmit a signal generated from the transmitting module 40/50. And, the antenna 5/10 may receive a radio signal from outside and may then deliver the received radio signal to the receiving module 60/70. In case that a multiple-antenna (MIMO) function is supported, at least two antennas may be provided.

The antenna, transmitting module and receiving module may be able to configure a radio frequency (RF) communication module.

The processor 20/30 may generally control overall operations of a mobile station. In particular, the processor may be able to perform a control function for performing the above-described embodiments of the present invention, a MAC (medium access control) frame variable control function according to service characteristics and propagation environment, a handover function, an authentication function, an encryption function and the like. In more particular, the processor 20/30 may be able to perform overall controls to execute the above-mentioned random access procedure.

Specifically, the processor of the mobile station selects a preamble sequence suitable for the purpose to perform a ranging or bandwidth request and may control the radio frequency communication module to transmit the selected preamble sequence to a specific random access region of the base station. The processor of the mobile station may be able to obtain ACK information indicating a success or failure of transmission of the transmitted preamble sequence and resource allocation information on a resource allocated to the mobile station in a manner of decoding A-MAP IE masked with ID of the specific random access region only. In this case, the ID of the random access region may be assigned per usage or by a subframe/frame unit.

Besides, the processor of the mobile station may be able to perform overall control operations of the operating process disclosed in the above-mentioned embodiments.

The transmitting module 40/50 may perform prescribed coding and modulation on data, which is scheduled by the processor and will be then transmitted externally, and may be then able to deliver the coded and modulated data to the antenna 10.

The receiving module 60/70 may reconstruct the radio signal received externally via the antenna 5/10 into original data in a manner of performing decoding and demodulation on the received radio signal and may be then able to deliver the reconstructed original data to the processor 20/30.

The memory 80/90 may store programs for processing and control of the processor 20/30 and may be able to perform a function of temporarily storing input/output data. And, the memory 80/90 may include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

Meanwhile, the base station may use at least one of the above-mentioned modules to perform a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function, and the like or may further include separate means, modules, parts and/or the like to perform theses functions.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the present invention may be applicable to various wireless access systems. And, 3GPP ($3^{rd}$ generation partnership project), 3 GPP2 and/or IEEE 802.xx (institute of electrical and electronic engineers 802) system and the like are examples for the various wireless access systems. Embodiments of the present invention may be applicable to all technical fields having the various wireless access systems applied thereto as well as the various wireless access systems.

What is claimed is:

1. A method of performing a random access procedure by a mobile station (MS) in a wireless communication system, the method comprising:
    transmitting, by the MS to a base station (BS), a preamble sequence via an uplink frame; and
    receiving, by the MS from the BS, an MAP Information Element (IE) for uplink resource allocation including a field indicating whether the uplink resource allocation is a bandwidth request grant or a ranging grant,
    wherein a cyclic redundancy check (CRC) of the MAP IE is masked with a first identifier, the first identifier including a second identifier from among 4 second identifiers assigned per a single superframe, and the second identifier included in the first identifier corresponding to the uplink frame via which the preamble sequence has been transmitted.

2. The method of claim 1, wherein the uplink frame includes one or more channel regions which are available for transmitting the preamble sequence, and the first identifier corresponds to an identifier of a channel region selected for transmitting the preamble sequence among the one or more channel regions in the uplink frame.

3. The method of claim 2, further comprising:
    determining the first identifier using the second identifier corresponding to the uplink frame and the identifier of the selected channel region in the uplink frame; and
    decoding the MAP IE using the determined first identifier.

4. The method of claim 2, wherein, if the preamble sequence is a bandwidth request preamble sequence, the selected channel region is the bandwidth request channel region and the method further comprises receiving a bandwidth request acknowledgement A-MAP information element (BR ACK A-MAP IE) including an index of the bandwidth request preamble sequence.

5. The method of claim 2, wherein, if the preamble sequence is an initial or handover ranging preamble sequence, the selected channel region is the ranging channel region and the method further comprises receiving a ranging acknowledgement (AAI_RNG-ACK) message including an index of the initial or handover ranging preamble sequence.

6. A method of performing a random access procedure by a base station (BS) in a wireless communication system, the method comprising:
    receiving, by the BS from a mobile station (MS), a preamble sequence via an uplink frame;
    transmitting, by the BS to the MS, an MAP Information Element (IE) for uplink resource allocation including a field indicating whether the uplink resource allocation is a bandwidth request grant or a ranging grant,
    wherein a cyclic redundancy check (CRC) of the MAP IE is masked with a first identifier, the first identifier including a second identifier from among 4 second identifiers assigned per a single superframe, and the second identifier included in the first identifier corresponding to the uplink frame via which the preamble sequence has been received.

7. The method of claim 6, wherein the uplink frame includes one or more channel regions which are available for transmitting the preamble sequence, and the first identifier corresponds to an identifier of a channel region selected for transmitting the preamble sequence among the one or more channel regions in the uplink frame.

8. The method of claim 7, further comprising:
    determining the first identifier using the second identifier corresponding to the uplink frame and the identifier of the selected channel region in the uplink frame; and
    masking the CRC of the MAP IE using the determined first identifier.

9. The method of claim 7, wherein, if the preamble sequence is a bandwidth request preamble sequence, the selected channel region is the bandwidth request channel region and the method further comprises transmitting a bandwidth request acknowledgement A-MAP information element (BR ACK A-MAP IE) including an index of the bandwidth request preamble sequence.

10. The method of claim 7, wherein, if the preamble sequence is an initial or handover ranging preamble sequence, the selected channel region is the ranging channel region and method further comprises transmitting a ranging acknowledgement (AAI_RNG-ACK) message including an index of the initial or handover ranging preamble sequence.

11. A mobile station comprising:
    a processor; and
    a radio communication (RF) module having a plurality of antennas, the radio communication module configured to transmit/receive a radio signal externally under the control of the controller,
    wherein the processor is configured to control the RF module to:
        transmit, to a base station (BS), a preamble sequence via an uplink frame; and
        receive, from the BS, an MAP Information Element (IE) for uplink resource allocation including a field indicating whether the uplink resource allocation is a bandwidth request grant or a ranging grant, from the base station,
    wherein a cyclic redundancy check (CRC) of the MAP IE is masked with a first identifier, the first identifier including a second identifier from among 4 second identifiers assigned per a single superframe, and the second identifier included in the first identifier corresponding to the uplink frame via which the preamble sequence has been transmitted.

12. The mobile station of claim 11, wherein the uplink frame includes one or more channel regions which are available for transmitting the preamble sequence, and the first identifier corresponds to an identifier of a channel region selected for transmitting the preamble sequence among the one or more channel regions in the uplink frame.

13. The mobile station of claim 12, wherein the processor is further configured to:
    determine the first identifier using the second identifier corresponding to the uplink frame and the identifier of the selected channel region in the uplink frame, and
    decode the MAP IE using the determined first identifier.

14. The mobile station of claim 12, wherein, if the preamble sequence is a bandwidth request preamble sequence, the selected channel region is the bandwidth request channel region and the processor controls the RF module to receive a bandwidth request acknowledgement A-MP information element (BR ACK A-MAP IE) including an index of the bandwidth request preamble sequence.

15. The mobile station of claim 12, wherein, if the preamble sequence is an initial or handover ranging preamble sequence, the selected channel region is the ranging channel region and the processor controls the RF module to receive a ranging acknowledgement (AAI_RNG-ACK) message including an index of the initial or handover ranging preamble sequence.

* * * * *